United States Patent
Wang

(10) Patent No.: US 9,625,052 B2
(45) Date of Patent: Apr. 18, 2017

(54) DOUBLE-GUIDANCE SHIFT FORK TRANSMISSION BOX

(71) Applicant: CHENGDU MAIKESEN FLUID CONTROL EQUIPMENT CO., LTD., Chengdu, Sichuan (CN)

(72) Inventor: Zhengquan Wang, Chengdu (CN)

(73) Assignee: CHENGDU MAIKESEN FLUID CONTROL EQUIPMENT, Chengdu (CN)

( * ) Notice: Subject to any disclaimer, the term of this patent is extended or adjusted under 35 U.S.C. 154(b) by 155 days.

(21) Appl. No.: 14/425,347

(22) PCT Filed: Aug. 19, 2013

(86) PCT No.: PCT/CN2013/081729
§ 371 (c)(1),
(2) Date: Mar. 3, 2015

(87) PCT Pub. No.: WO2014/040475
PCT Pub. Date: Mar. 20, 2014

(65) Prior Publication Data
US 2015/0211656 A1    Jul. 30, 2015

(30) Foreign Application Priority Data
Sep. 17, 2012    (CN) .......................... 2012 1 0343414

(51) Int. Cl.
*F16H 63/32*    (2006.01)
*F16K 31/44*    (2006.01)
(Continued)

(52) U.S. Cl.
CPC ............. *F16K 31/44* (2013.01); *F16H 63/32* (2013.01); *F16K 31/02* (2013.01); *F16K 31/12* (2013.01)

(58) Field of Classification Search
CPC .......... F16K 31/44; F16K 31/02; F16K 31/04; F16K 31/50; F16K 31/52; F16H 63/32;
(Continued)

(56) References Cited

U.S. PATENT DOCUMENTS

2002/0124668 A1    9/2002    Funfer

FOREIGN PATENT DOCUMENTS

CN    101210633 A    7/2008
CN    101865267 A    10/2010
(Continued)

OTHER PUBLICATIONS

Nov. 21, 2013 International Search Report issued in Application No. PCT/CN2013/081729.
(Continued)

*Primary Examiner* — Marina Tietjen
(74) *Attorney, Agent, or Firm* — Chieh-Mei Wang

(57) ABSTRACT

A double-guidance shift fork transmission box, including a shift fork box body, wherein a shift fork transmission structure and two parallel guide shafts are mounted on the body; a transmission sliding block component is arranged between the guide shafts and can freely slide along them, and the component is connected to the transmission structure. For a conventional shift fork transmission structure having no or one guide shaft, the transmission sliding block component, in the motion process, is affected by thrust of the power output shaft and motion resistance of the shift fork transmission structure only, so that mechanical transmission efficacy and mechanical efficiency of the shift fork and the shift fork box are improved, and stress of the transmission sliding block component on non-axial direction of the guide shaft is eliminated; and thrust generated from the power output shaft is transmitted onto the shift fork transmission structure without loss.

8 Claims, 2 Drawing Sheets

(51) Int. Cl.
*F16K 31/02* (2006.01)
*F16K 31/12* (2006.01)

(58) Field of Classification Search
CPC .............. F16H 59/041; F16H 2063/32; F16H 2063/321; F16H 2063/322; Y10T 74/19223; Y10T 74/19233; Y10T 74/19219; B25D 16/006; B25D 2250/191
USPC .......................................... 251/279; 74/325
See application file for complete search history.

(56) References Cited

FOREIGN PATENT DOCUMENTS

| | | |
|---|---|---|
| CN | 102478120 A | 5/2012 |
| CN | 202392244 U | 8/2012 |
| DE | 102008036126 A1 | 2/2010 |
| GB | 834885 A | 5/1960 |

OTHER PUBLICATIONS

Chinese Office Action issued in Application No. 2012103434145.
Written Opinion issued in International Application No. PCT/CN2013/081729.
Aug. 16, 2016 Supplementary European Search Report issued in European Patent Applicaton No. 13836263.7.

DOUBLE-GUIDANCE SHIFT FORK TRANSMISSION BOX

TECHNICAL FIELD OF THE INVENTION

The present invention relates to a shift fork transmission mechanism, and in particular relates to a double-guidance shift fork transmission box.

BACKGROUND OF THE INVENTION

With rise of modern energy, iron & steel, electric power, military and aerospace industries as well as development of such industries as petroleum, natural gas and modern chemical engineering, valve and valve actuator become indispensable and important product in industry control, and in the fluid control field and valve automation industry, valve actuator is a necessary valve driving device for realizing remote control and self-control of the valve. As control process and control requirement increase, electric valve actuator fails to meet requirement any longer on such aspects of electric explosion protection, speed of action and response time, therefore pneumatic-hydraulic actuator, electric-hydraulic actuator and the like emerge at this right moment. And shift fork transmission mechanism is the most important component of the actuator.

In pneumatic, hydraulic, pneumatic-hydraulic and electric-hydraulic actuators of shift fork transmission mechanism, shift fork transmission box (shift fork box) composed of a shift fork box body and a shift fork transmission component acts as an important part, and the shift fork box is also an important part of the shift fork type valve actuator. The shift fork type actuator is a shift fork transmission mechanism composed of a shift fork box, a guide shaft, a shift fork and a shift fork component; under thrust of air cylinder (hydraulic), linear motion of air cylinder piston is converted into a transmission structure that shift fork shaft outputs in a form of motion at a pendulum angle through a transmission sliding block. The shift fork type actuator is subject to a working characteristic that output torque of the actuator is changed as rotating angle of the shift fork becomes different in a transmission process, wherein output torques on left and right sides are the maximum ones and the output torque on the middle position is the minimum one. This characteristic is consistent with a rule that torque value on the position that a rotary motion valve is opened or closed is the maximum and the torque on the middle running position is the minimum, thus avoiding torque waste and minimizing required cylinder diameter; and shift fork of the shift fork pneumatic actuator is highly overlapped with shift fork arm; so that space is greatly saved.

Pneumatic actuator includes pinion-and-rack pneumatic actuator and shift fork pneumatic actuator: the pinion-and-rack pneumatic actuator, on the basis of pinion-and-rack engagement driving principle, must guarantee long and thick gear of gears of wheel disc, and two gears, when keeping 0 degree, can be engaged constantly without separation while can be completely engaged when keeping a right angle; therefore, heavy size of this pinion-and-rack pneumatic actuator is determined fundamentally, and the expression of being heavy is more obvious as the torque is higher; thus, shift fork pneumatic actuator emerges; the shift fork pneumatic actuator not only meets an explosion-proof requirement, but also is small in size, light in weight and large in torque; the shift fork actuator, which adopts unique transmission structure design of "single cylinder and dual pistons-shift fork variable torque", is produced in accordance with high requirement on working condition; the shift fork pneumatic actuator will dominate the industry in the future.

The present shift fork transmission mechanism, which has no or any one guide shaft, just keeps one force arm distance between oil cylinder (oil cylinder) piston output shaft on the side of the shift fork box and shift fork transmission shaft, therefore lateral force is subsequently generated, which not only reduces transmission efficiency and increases lateral stress on shift fork bearing, air cylinder piston and bearing, but also reduces output rigidity of piston shaft; and the shift fork may be instable in running, thus causing influence on reliability of transmission.

SUMMARY OF THE INVENTION

The present invention aims at providing a double-guidance shift fork transmission box, which, mounted in a shift fork transmission mechanism guided on two circumferences, can solve problems of the present shift fork transmission actuator which is unreasonable in structural design; so that purposes of eliminating lateral force, improving transmission efficiency and reducing assembly difficulty are achieved.

Purposes of the present invention are realized by a technical scheme as follows:

There is provided a double-guidance shift fork transmission box, which comprises a shift fork box body, wherein a shift fork transmission structure is mounted on the shift fork box body; two parallel guide shafts are mounted on the shift fork box body; a transmission sliding block component which can freely slide along the guide shafts is arranged between the two guide shafts, and the transmission sliding block component is connected to the shift fork transmission structure. Through such skillful design that two parallel guide shafts are arranged on the shift fork box body, the two parallel guide shafts are parallel with output shaft of an air cylinder piston outside and central axes are coplanar, the transmission sliding block component is mounted on the two parallel guide shafts, and the transmission sliding block component can freely slide along axes of the guide shafts between the two guide shafts, when used, power output shaft outside is connected on the transmission sliding block component, the transmission sliding block component is driven to do reciprocating motion by the power output shaft, the transmission sliding block component is connected on the shift fork transmission structure and the shift fork transmission structure, driven by the transmission sliding block component, can rotate around the axis, thus realizing a purpose of shift fork transmission. Through such design and installation, motion trend of the transmission sliding block component under thrust of the power output shaft is corrected thoroughly, motion route and motion trail of the transmission sliding block component are fixed, and the transmission sliding block component has one motion trail only under thrust or pull of the power output shaft, i.e., the transmission sliding block component does linear motion along piston shaft; in the motion process, the transmission sliding block component is under a stress state only, i.e., stress along the guide shaft. For conventional shift fork transmission structure having no or one guide shaft, the transmission sliding block component, in the motion process, is affected by thrust of the power output shaft and motion resistance of the shift fork transmission structure only, so that mechanical transmission efficacy and mechanical efficiency of the shift fork and the shift fork box are improved, and stress of the transmission sliding block component on non-axial direction of the guide shaft is eliminated thoroughly; and thrust generated from the power output shaft is transmitted onto the shift fork transmission structure without loss completely in theory.

The transmission sliding block component comprises a transmission sliding block body; assembly blocks are mounted on two sides of the transmission sliding block body, and surfaces of the assembly blocks, in contact with the transmission sliding block body, sink inwards to form cylindrical grooves; strip-shaped through holes are formed at the bottoms of the grooves, and two sides of the assembly blocks are communicated through the strip-shaped through holes. The transmission sliding block body is integrally represented as a rectangular structure, and some edges and corners can be cut off to reduce overall weight and volume; assembly blocks are mounted on two side faces of the transmission sliding block body, the assembly blocks are integrally represented as rectangular structures, and surfaces of the assembly blocks, in contact with the transmission sliding block body, sink inwards to form grooves; the grooves are of cylindrical structures, and strip-shaped through holes are formed at the bottoms of the grooves; an integrated cavity is formed by the grooves and the through holes and is communicated with two side faces of the assembly blocks; the two assembly blocks are connected to the transmission sliding block body through such ways as bolt; a cavity structure is formed by the grooves and the through holes between the assembly blocks and the transmission sliding block body; the strip-shaped through holes serve as passages between the cavity and external side, and the end of the power output shaft is of a structure matched with the strip-shaped through holes; a convex block at the end, after inserted in the through hole, is rotated by a certain angle, so that the power output shaft is connected to the transmission sliding block body on the basis of a structural characteristic that diameter of the cavity is more than the minimum diameter of the through hole, which, for a conventional connecting way, facilitates assembling, greatly reduces assembly difficulty and process, saves time, and reduces assembly cost in another form.

Two parallel guide holes perpendicular to the assembly blocks are arranged on the transmission sliding block body; a sliding block transmission pin running through the transmission sliding block body is mounted on the side face of the transmission sliding block body; an axis of the sliding block transmission pin is perpendicular to a plane of the axes of the two guide holes; and a transmission block is sleeved on the sliding block transmission pin protruded out of the transmission sliding block body. Two guide holes are arranged on the transmission sliding block body; the guide holes are perpendicular to the assembly blocks, and axes of the guide holes are mutually parallel; an assembly hole is formed on the side face of the transmission sliding block body; a sliding block transmission pin is mounted in the assembly hole; the assembly hole runs through the side face of the transmission sliding block body, and axis is perpendicular to the plane of the axes of the two guide holes; the sliding block transmission pin is located on symmetrical line of the axes of the two guide hole; the sliding block transmission pin is longer than the assembly hole; a transmission block is sleeved on the sliding block transmission pin protruded out of the transmission sliding block body; the transmission block can freely rotate around the sliding block transmission pin; the two guide shafts run through the guide hole respectively; the transmission sliding block body is mounted on the power output shaft through the assembly block; the two transmission blocks are sleeved in chutes of the two shift fork sheets respectively; the power output shaft can do reciprocating motion on axis thereof; thrust is transmitted to the shift fork sheet through the transmission block; the rotating drum is rotated by the shift fork sheet in the rotating process, thus finishing a process of shift fork rotation; relative to the conventional shift fork transmission structure, by setting the two guide holes, two guide shafts are mounted in the guide holes and the sliding block transmission pin is located between the two guide shafts, so that the transmission sliding block can do linear motion along the guide shafts only; under a circumstance that position of the sliding block transmission pin is relatively fixed, thrust stressing point can be on any position of the transmission block as the thrust on the transmission sliding block body is parallel with the guide shafts, and torque output curve of the actuator will not change; so that quantity and relative mounting position of air cylinder on the shift fork box can be adjusted as required; therefore, the shift fork transmission structure is more excellent that conventional actuator in stress position and space design.

A notch is arranged on each assembly block; the notch is located on extension line of the guide hole, and diameter of the notch is matched with diameter of the guide hole. Specifically, overall appearance of the assembly block is of a rectangular structure and volume of the assembly block is less than that of the transmission sliding block body; the notches are arranged on upper and lower sides of the assembly block, and the notches are extension parts of the guide holes; through the two assembly blocks, the transmission sliding block body is connected and fixed in middle, thus realizing compact structure and facilitating processing.

A sliding bushing is mounted in each guide hole. Furthermore, as an improvement of the present invention, through structural forms that the sliding bushing is arranged in the guide hole and the guide shaft runs through the sliding bushing, friction between the transmission sliding block body and the guide shaft is reduced, thus facilitating change of the sliding bushing and prolonging overall service life.

The shift fork transmission structure comprises a rotating drum; the inside of the rotating drum is of a cavity structure; two shift fork sheets sleeved on the rotating drum are welded on the rotating drum, and each shift fork sheet is formed with a chute thereon. The rotating drum is of a cylindrical structure, and inside of the rotating drum is of a cavity structure; two shift fork sheets are arranged on the outer sidewall of the rotating drum, and the two shift fork sheets are mutually parallel; the two shift fork sheets, when used, are located above and below the two guide shafts respectively; any one of the shift fork sheets is located on the radial direction of the rotating drum, and the shift fork sheet is perpendicular to the axis of the rotating drum; on the axial direction of the rotating drum, the two shift fork sheets are completely overlapped, and the shift fork sheets comprise two parts: connecting plate and pulling plate; the connecting plate is mechanically processed with through hole, and the through hole is matched with the outer diameter of the rotating drum; the rotating drum is welded and fixed after running through the through hole; a chute is formed on the pulling plate for pushing the part to slide in an action process; through a structural form that the shift fork sheets are sleeved on the rotating drum, force on the rotating drum is uniformly distributed on the sidewall of the rotating drum, thus avoiding uneven torque on the rotating drum and prolonging service life of the rotating drum; meanwhile, through design that the two shift fork sheets are mutually parallel and the two shift fork sheets are respectively located on the upper and lower sides of the transmission head when being used, external force on the shift fork sheets in the axial direction of the rotating drum cancels out, so as to prevent the shift fork sheets from becoming bent or deformed.

Two key slots are formed on the inner sidewall of the rotating drum, and the two key slots are symmetrically distributed relative to the axis of the chute. Furthermore, to keep stress on the rotating drum balanced, a structural form that two symmetrical key slots are arranged on the inner sidewall of the rotating drum is adopted and the chute serves as a symmetry axis of the two key slots, two sides of the shift fork sheet, in a using process, are symmetrical in force and moment, thus avoiding possible damage caused by unbalanced stress and prolonging service life.

A reinforced connecting ring is formed by crater on the joint of the rotating drum and the shift fork sheet. Furthermore, to enhance connecting strength of the rotating drum and the shift fork sheet, the crater is thickened and is trimmed to form the reinforced connecting ring; and connecting strength between the shift fork sheet and the rotating drum can be enhanced to improve tolerance thereof.

A travel limit rod which is located between the two guide shafts and is parallel to the two guide shafts is mounted on the shift fork box body. Furthermore, the integral inside of the shift fork box body is of a cavity structure which is formed by combining shells. The travel limit rod is arranged between the two guide shafts; the axis of the travel limit rod is parallel with the guide shafts, and length of the travel limit rod inserted in the shift fork box body can be regulated to adapt to different demands.

Compared to the prior art, the present invention has advantages and beneficial effects as follows:

1. There is provided a double-guidance shift fork transmission box, wherein power output shaft outside is connected on the transmission sliding block component, the transmission sliding block component is driven to do reciprocating motion by the power output shaft, the transmission sliding block component is connected on the shift fork transmission structure and the shift fork transmission structure, driven by the transmission sliding block component, can rotate around the axis, thus realizing a purpose of shift fork transmission. Through such design and installation, motion trend of the transmission sliding block component under thrust of the power output shaft is corrected thoroughly, motion route and motion trail of the transmission sliding block component are fixed, and the transmission sliding block component has one motion trail only under thrust or pull of the power output shaft, i.e., the transmission sliding block component does linear motion along piston shaft; in the motion process, the transmission sliding block component is under a stress state only, i.e., stress along the guide shaft. For conventional shift fork transmission structure having no or one guide shaft, the transmission sliding block component, in the motion process, is affected by thrust of the power output shaft and motion resistance of the shift fork transmission structure only, so that mechanical transmission efficacy and mechanical efficiency of the shift fork and the shift fork box are improved, and stress of the transmission sliding block component on non-axial direction of the guide shaft is eliminated thoroughly; and thrust generated from the power output shaft is transmitted onto the shift fork transmission structure without loss completely in theory;

2. There is provided a double-guidance shift fork transmission box, wherein the two assembly blocks are connected to the transmission sliding block body through such ways as bolt; a cavity structure is formed by the grooves and the through holes between the assembly blocks and the transmission sliding block body; the strip-shaped through holes serve as passages between the cavity and external side, and the end of the power output shaft is of a structure matched with the strip-shaped through holes; a convex block at the end, after inserted in the through hole, is rotated by a certain angle, so that the power output shaft is connected to the transmission sliding block body on the basis of a structural characteristic that diameter of the cavity is more than the minimum diameter of the through hole, which, for a conventional connecting way, facilitates assembling, greatly reduces assembly difficulty and process, saves time, and reduces assembly cost in another form;

3. There is provided a double-guidance shift fork transmission box, wherein relative to the conventional shift fork transmission structure, by setting the two guide holes, two guide shafts are mounted in the guide holes and the sliding block transmission pin is located between the two guide shafts, so that the transmission sliding block can do linear motion along the guide shafts only; under a circumstance that position of the sliding block transmission pin is relatively fixed, thrust stressing point can be on any position of the transmission block as the thrust on the transmission sliding block body is parallel with the guide shafts, and torque output curve of the actuator will not change; so that quantity and relative mounting position of air cylinder on the shift fork box can be adjusted as required; therefore, the shift fork transmission structure is more excellent that conventional actuator in stress position and space design.

4. There is provided a double-guidance shift fork transmission box, wherein the shift fork sheets comprise two parts: connecting plate and pulling plate; the connecting plate is mechanically processed with through hole, and the through hole is matched with the outer diameter of the rotating drum; the rotating drum is welded and fixed after running through the through hole; a chute is formed on the pulling plate for pushing the part to slide in an action process; through a structural form that the shift fork sheets are sleeved on the rotating drum, force on the rotating drum is uniformly distributed on the sidewall of the rotating drum, thus avoiding uneven torque on the rotating drum and prolonging service life of the rotating drum; meanwhile, through design that the two shift fork sheets are mutually parallel and the two shift fork sheets are respectively located on the upper and lower sides of the transmission head when being used, external force on the shift fork sheets in the axial direction of the rotating drum cancels out, so as to prevent the shift fork sheets from becoming bent or deformed.

Marks and corresponding part names in attached drawings:

1—rotating drum, 2—shift fork sheet, 3—chute, 4—key slot, 5—reinforced connecting ring, 6—transmission sliding block body, 7—guide hole, 8—sliding block transmission pin, 9—transmission block, 10—assembly block, 11—notch, 12—sliding bushing, 13—power output shaft, 14—groove, 15—through hole, 16—fastening bolt, 17—cover plate, 18—shift fork box body, 19—guide shaft, 20—travel limit rod.

DETAILED DESCRIPTION OF EMBODIMENTS

The present invention will be further explained in details in conjunction with embodiment, but embodiment of the invention is not limited herein.

Embodiment

Figure 1:
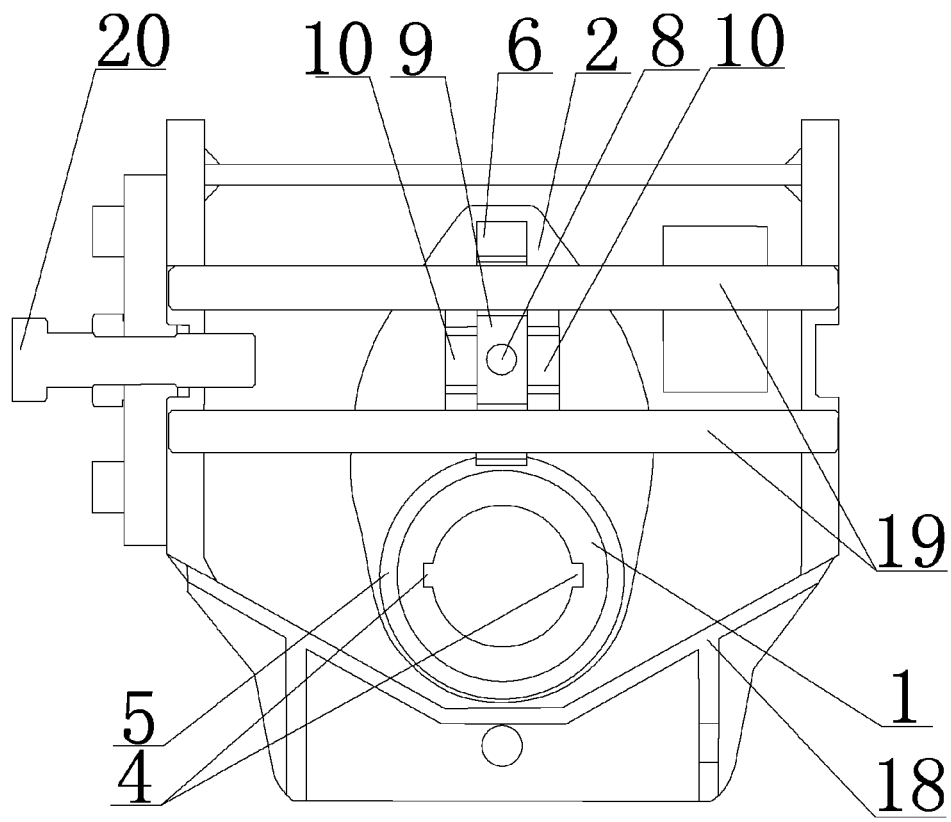
FIG. 1 is a structural schematic diagram of omitting a shift fork sheet in the shift fork box body according to the invention.
Figure 2:
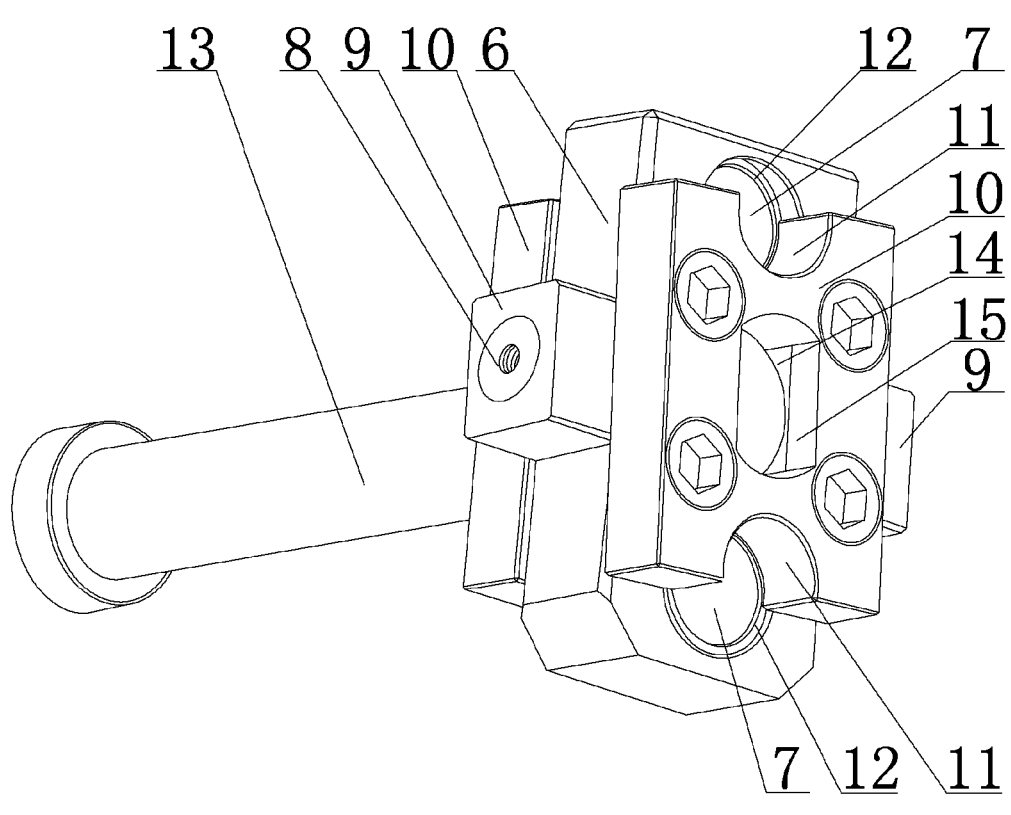
FIG. 2 is a structural schematic diagram of connecting status of the transmission sliding block component according to the invention.
Figure 3:
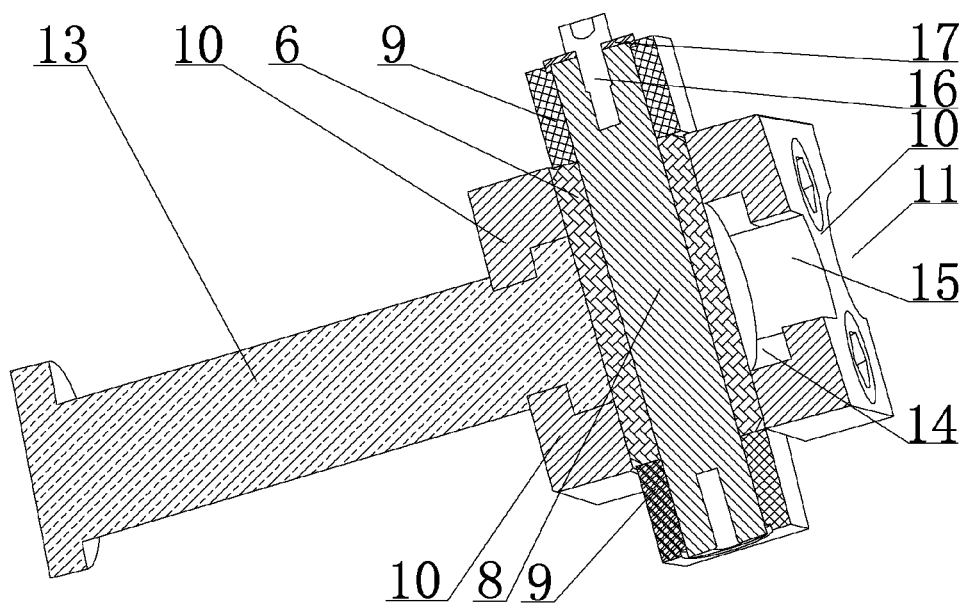
FIG. 3 is a half-section structural schematic diagram of the FIG. 2 along axis of the sliding block transmission pin.
Figure 4:
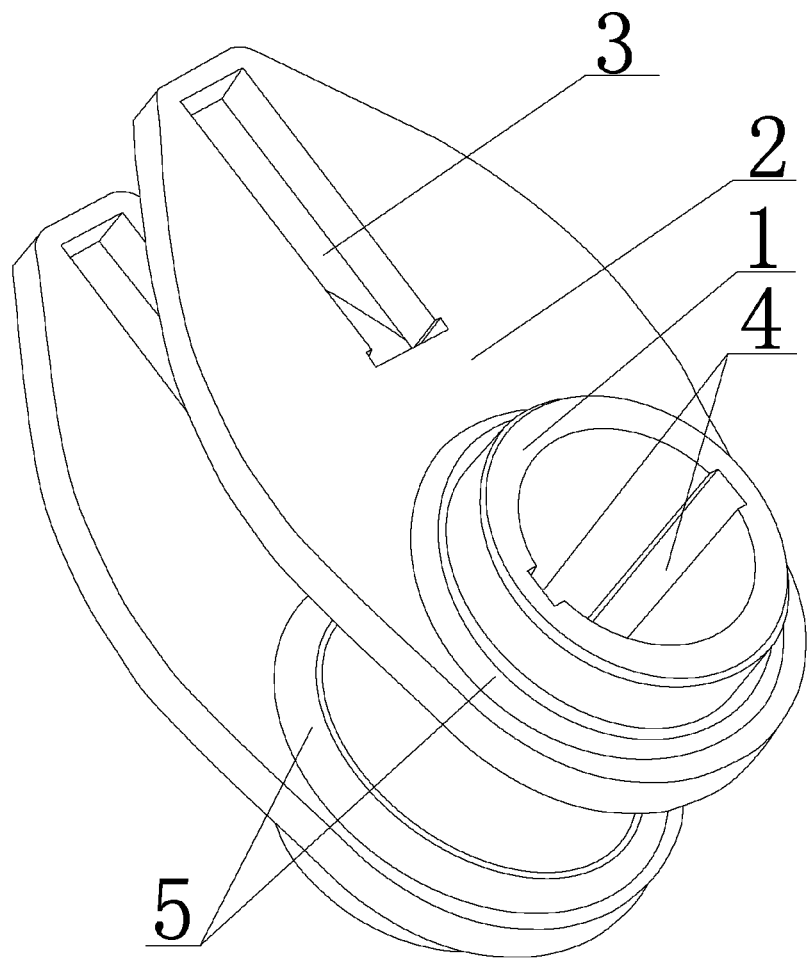
FIG. 4 is an independent structural schematic diagram of the shift fork transmission structure according to the invention.

As shown in FIG. 1-4, there is provided a double-guidance shift fork transmission box, which comprises a shift fork box body 18, wherein the shift fork box body 18 is integrally formed by combining an upper shell and a lower shell, and inside of the shift fork box body 18 is of a cavity structure; a shift fork transmission structure is mounted on the shell; the shift fork transmission structure comprises a rotating drum 1; the rotating drum is of a cylindrical structure and inside of the rotating drum is of a cavity structure; two shift fork sheets 2 are arranged on the outer sidewall of the rotating drum, and the two shift fork sheets 2 are mutually parallel; any one of the shift fork sheets 2 is located on the radial direction of the rotating drum 1, and the shift fork sheet 2 is perpendicular to the axis of the rotating drum 1; on the axial direction of the rotating drum 1, the two shift fork sheets 2 are completely overlapped, and the shift fork sheets 2 comprise two parts: connecting plate and pulling plate; the connecting plate is mechanically processed with through hole, and the through hole is matched with the outer diameter of the rotating drum 1; the rotating drum 1 is welded and fixed after running through the through hole; a chute 3 is formed on the pulling plate; the chute 3 is represented as a rectangular strip-shaped hole and axis thereof is located on an extension line of the diameter of the rotating drum 1; two key slots 4 are formed on the inner sidewall of the rotating drum 1, and the two key slots 4 are symmetrically distributed relative to the axis of the chute 3; a crater on the joint of the rotating drum 1 and the shift fork sheet 2 is thickened and is trimmed to form a reinforced connecting ring 5; two guide shafts 19 are mounted in the shift fork box body 18; a plane of the axes of the two guide shafts 19 is perpendicular to the rotating drum 1, and the guide shafts 19 are located between the two shift fork sheets 2; a transmission sliding block component is mounted between the two guide shafts 19; the transmission sliding block component comprises a transmission sliding block body 6 which is integrally represented as a rectangle; some edges and corners of the transmission sliding block body 6 can be cut off to reduce overall weight and volume; two guide holes 7 are arranged on the transmission sliding block body 6; axes of the guide holes 7 are mutually parallel; changeable sliding bushings 12 are mounted in the guide holes 7; the sliding bushings 12 are sleeved on the guide shafts 19; an assembly hole is formed on the side face of the transmission sliding block body 6; a sliding block transmission pin 8 is mounted in the assembly hole; the assembly hole runs through the side face of the transmission sliding block body 6, and the axis thereof is perpendicular to a plane of axes of the two guide holes 7; the sliding block transmission pin 8 is located on a symmetrical line of axes of the two guide holes 7; the sliding block transmission pin 8 is longer than the assembly hole; a transmission block 9 is sleeved on the sliding block transmission pin protruded out of the transmission sliding block body 6; the transmission block 9 is connected on the sliding block transmission pin 8 through a fastening bolt 16 and a cover plate 17 which are matched; the transmission block 9 can freely rotate around the sliding block transmission pin 8; the transmission block 9 is located in the chute 3 of the shift fork sheet 2; assembly blocks 10 are mounted on two end faces of the transmission sliding block body 6 at opening end of the guide hole 7; overall appearance of the assembly block 10 is of a rectangular structure and volume of the assembly block is less than that of the transmission sliding block body 6; the notches 11 are arranged on upper and lower sides of the assembly block, and the notches 11 are extension parts of the guide holes 7; diameters of the notches 11 are matched with diameters of the guide holes 11; surfaces of the assembly blocks 10, in contact with the transmission sliding block body 6, sink inwards to form grooves 14, and the grooves 14 are of cylindrical structures; strip-shaped through holes 15 are formed at the bottoms of the grooves 14; an integral cavity is formed by the grooves 14 and the through holes 15, and is communicated with two sides of the assembly blocks 10; the two assembly blocks 10 are connected to the transmission sliding block body 6 through such ways as bolt; the grooves 14 and the through holes 15 form a cavity structure between the assembly blocks 10 and the transmission sliding block body 6; the strip-shaped through holes 15 function as passages between the cavity and external part; preferably, cross section of each through hole 15 is represented as a sealed face which is formed by sectioning a round structure through a parallel line; diameters of the grooves 14 are matched with the maximum diameters of the through holes 15; a bump matched with the strip-shaped through holes 15 is arranged at the end of the power output shaft 13; the bump is fixed on the power output shaft 13 through a connecting part which is relatively small in diameter; by rotating the power output shaft 13, the power output shaft 13 can be connected with or separated from the transmission sliding block body 6; a travel limit rod 20 is mounted on the shift fork box body 18 relative to the power output shaft 13; the axial line of the travel limit rod 20 is parallel with the axial line of the guide shaft 19; and extension length of the travel limit rod 20 can be regulated.

In conclusion, the foregoing embodiments merely are better embodiments of the present invention, and not intended to define the scope of the invention in any form. Any simple modification or equivalent change on the embodiments according to technical spirit of the invention should be within the protection scope of the invention.

The invention claimed is:
1. A Double-guidance shift fork transmission box, comprising:
a shift fork box body mounted with a shift fork transmission structure thereon;
two parallel guide shafts mounted on the shift fork box body; and
a transmission sliding block component freely slidable along the guide shafts mounted between the two guide shafts and connected to the shift fork transmission structure, wherein the transmission sliding block component comprises a transmission sliding block body, a plurality of assembly blocks are mounted on two sides of the transmission sliding block body, faces of the assembly blocks in contact with the transmission sliding block body are sunken inwards to form a plurality of cylindrical grooves, a plurality of strip-shaped through holes are formed at bottoms of the cylindrical grooves, and two sides of the assembly blocks are communicated through the strip-shaped through holes.

2. The double-guidance shift fork transmission box according to claim 1, wherein two parallel guide holes perpendicular to the assembly blocks are arranged on the transmission sliding block body a sliding block transmission pin running through the transmission sliding block body is mounted on a side face of the transmission sliding block body, an axis of the sliding block transmission pin is perpendicular to a plane of axes of the two parallel guide holes, and a transmission block is sleeved on the sliding block transmission pin protruded out of the transmission sliding block body.

3. The double-guidance shift fork transmission box according to claim 2, wherein a notch is arranged on the assembly block, the notch is located on an extension line of the guide holes, and a diameter of the notch is matched with diameters of the guide holes.

4. The double-guidance shift fork transmission box according to claim 2, wherein a sliding bushing is arranged in each of the guide holes.

5. A Double-guidance shift fork transmission box, comprising:
   a shift fork box body mounted with a shift fork transmission structure thereon;
   two parallel guide shafts mounted on the shift fork box body; and
   a transmission sliding block component freely slidable along the guide shafts mounted between the two guide shafts and connected to the shift fork transmission structure, wherein the shift fork transmission structure comprises a rotating drum, an inside of the rotating drum is of a hollow cavity structure, two shift fork sheets sleeved on the rotating drum are welded on the rotating drum, and each of the shift fork sheets is provided with a chute thereon.

6. The double-guidance shift fork transmission box according to claim 5, wherein two key slots are formed on an inner sidewall of the rotating drum, and the two key slots are symmetrically distributed relative to an axis of the chute.

7. The double-guidance shift fork transmission box according to claim 5, wherein a reinforced connecting ring is formed by a crater on a joint of the rotating drum and the shift fork sheet.

8. A Double-guidance shift fork transmission box, comprising:
   a shift fork box body mounted with a shift fork transmission structure thereon;
   two parallel guide shafts mounted on the shift fork box body; and
   a transmission sliding block component freely slidable along the guide shafts mounted between the two guide shafts and connected to the shift fork transmission structure, wherein a travel limit rod located between the two parallel guide shafts is mounted on the shift fork box body, and the travel limit is parallel to the two parallel guide shafts.

* * * * *